United States Patent [19]

Suzuki et al.

[11] Patent Number: 5,230,326
[45] Date of Patent: Jul. 27, 1993

[54] AUTOMOTIVE HEATING APPARATUS

[75] Inventors: Shigeru Suzuki; Kunifumi Goto; Wataru Minami; Nobuaki Hoshino; Shigeki Kanzaki, all of Kariya, Japan

[73] Assignee: Kabushiki Kaisha Toyoda Jidoshokki Seisakusho, Kariya, Japan

[21] Appl. No.: 967,017

[22] Filed: Oct. 27, 1992

[30] Foreign Application Priority Data

Oct. 31, 1991 [JP] Japan .................... 3-286359
Dec. 24, 1991 [JP] Japan .................... 3-341188

[51] Int. Cl.⁵ .............................................. F24C 9/00
[52] U.S. Cl. .................................. 126/247; 237/12.3 R
[58] Field of Search ............ 237/1 R, 12.3 R, 12.3 A, 237/12.3 B; 126/247; 122/26

[56] References Cited

U.S. PATENT DOCUMENTS 4,434,934 3/1984 Mosen et al. .............. 237/1 R X
4,773,388 9/1988 Herbulot et al. ........... 237/1 R X

FOREIGN PATENT DOCUMENTS 2-246823 10/1990 Japan .

OTHER PUBLICATIONS

English language Abstract of Japanese Unexamined Patent Application No. 2/246823 (reference AL) Nov. 1990.

*Primary Examiner*—Henry A. Bennet
*Attorney, Agent, or Firm*—Brooks Haidt Haffner & Delahunty

[57] ABSTRACT

An automotive heating apparatus includes a cylinder block forming an enclosed space therein, the gear pump means enclosed in the cylinder block, and a water jacket formed in the cylinder block outside the gear pump means. The gear pump means includes an input shaft connected to an engine and disposed in the enclosed space, a driving gear fixed to the input shaft and disposed in the enclosed space, a driven gear meshing with the driving gear and disposed in the enclosed space, and a viscous fluid sealed in the enclosed space. In the automotive heating apparatus, the viscous fluid is forcibly transferred from a suction side to a discharge side by the rotation of the driving gear and the driven gear, and at the same time there is caused a back flow of the viscous fluid resulting from an internal leakage from the discharge side to the suction side. Thus, the automotive heating apparatus stirs and shears the viscous fluid and increases the viscous fluid internal energy in the enclosed space, and it converts the heat generated by the viscous fluid to a temperature increment of circulating water through the water jacket. Hence, the automotive heating apparatus can not only achieve the heating in the automotive passenger room relatively quickly after starting the engine, but also produces a good on-boardability and a reduction in the manufacturing cost.

13 Claims, 9 Drawing Sheets

AUTOMOTIVE HEATING APPARATUS

BACKGROUND OF THE INVENTION

1. Field of the Invention

The present invention relates to an automotive heating apparatus.

2. Description of the Related Art

A conventional general-purpose type automotive heating apparatus is constructed as follows: It supplies high temperature circulating water, which has been used for cooling an engine, to a radiator, thereby cooling the circulating water. At the same time, it also supplies a part of the high temperature circulating water to a heater, and thereby it carries out the heat exchange from the high temperature circulating water to air at the heater. Consequently, it supplies hot air to a passenger room. The circulating water going through the heater is again used for cooling the engine together with the return circulating water.

However, this conventional general-purpose type automotive heating apparatus cannot supply the hot air to the passenger room until the circulating water for cooling the engine becomes considerably hot in temperature. Therefore, especially under a relatively low temperature environment in cold areas or the like, it takes a long time to achieve the heating in the passenger room after the engine is started.

Hence, as disclosed in Japanese Unexamined Patent Publication (KOKAI) No. 246,823/1990, an automotive heating apparatus has been developed in order to achieve the heating in the passenger room relatively quickly after starting the engine. The automotive heating apparatus comprises a viscous fluid coupling which is connected to an engine cooling circuit.

the viscous fluid coupling of the recently developed automotive heating apparatus includes a housing, an input shaft rotatably disposed in the housing and receiving an engine driving force by way of an electromagnetic clutch, a rotor disposed in the housing, fixed to the input shaft and having a labyrinth groove including a plurality of and a large area of walls, a cover fixed to the housing and having a labyrinth groove engaging with the labyrinth groove of the rotor and disposed away therefrom with predetermined spaces provided therebetween, and a viscous fluid such as a silicone oil or the like sealed between the rotor and the cover.

In the viscous fluid coupling, the circulating water sealed between the cover and the housing is circulated with an engine cooling apparatus. When the input shaft is rotated in order to rotate the rotor, the viscous fluid sealed between the rotor and the cover is caused to generate heat by the stirring and the shearing resulting from the relative rotation between the rotor and the cover. The heat thus generated is conveyed to the circulating water sealed between the cover and the housing, and thereby heating the circulating water. Finally, the circulating water thus heated is used for the heating in the passenger room through a heater.

However, the recently developed automotive heating apparatus set forth in the aforementioned publication employs the viscous fluid coupling whose rotor and cover have the labyrinth grooves including a plurality of and a large area of walls, respectively, and accordingly it is liable to enlarge. Namely, the automotive heating apparatus requires a large installation space in an engine room with a limited space provided, and accordingly it suffers from the on-boardability. Moreover, in the manufacture of the automotive heating apparatus, the rotor and the cover require complicated processing, and accordingly the manufacturing cost is increased inevitably.

Figure 10:
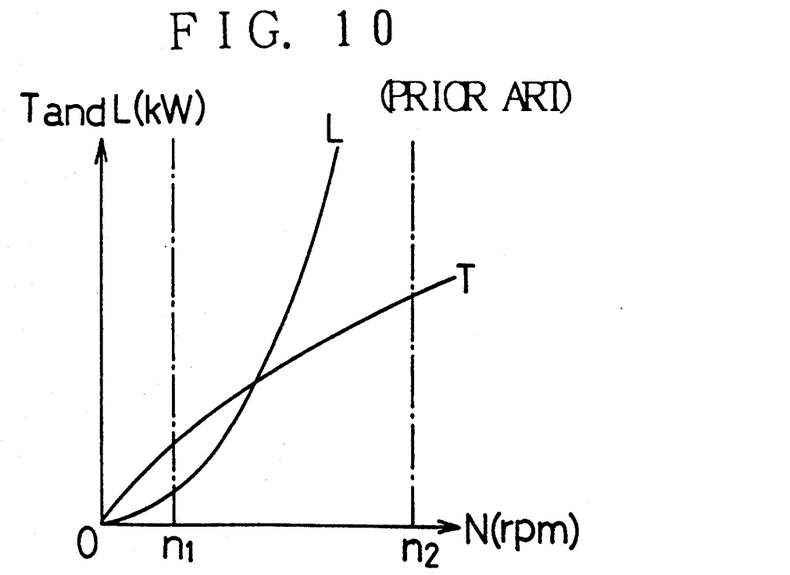
FIG. 10 is a graphic representation on a relationship between the input shaft driving torques and the number of engine revolutions in the conventional automotive heating apparatus.

In addition, as illustrated in FIG. 10, the recently developed automotive heating apparatus set forth in the aforementioned publication cannot avoid or interrupt the proportional relationship between the driving torque "T" of the input shaft and the number of engine revolutions "N" without turning on and off an electromagnetic clutch in an ordinary service area, e.g., the number of engine revolutions "N" between "$n_1$" and "$n_2$." Namely, the automotive heating apparatus requires a large power "L" and outputs a large heat generation during high speed automotive driving, and accordingly it increases the engine load and provides an excessive heating capacity. In order to avoid this drawback, it is necessary to frequently turn on and off the electromagnetic clutch during the high speed automotive driving. However, the electromagnetic clutch is deteriorated by the frequent turning on and off operation in a short period of time, and eventually no comfortable automotive driving feeling cannot be obtained.

SUMMARY OF THE INVENTION

The present invention has been developed in view of the circumstances described above. It is therefore a primary object of the present invention to provide an automotive heating apparatus which enables to achieve the heating in the passenger room relatively quickly after starting the engine, to produce a good on-boardability, and to reduce the manufacturing cost. It is a secondary object of the present invention to provide an automotive heating apparatus which not only enables to fulfill the primary object but also to reduce the engine load and the frequency of the turning on and off the electromagnetic clutch during high speed automotive driving so that the life of the electromagnetic clutch can be prolonged.

An automotive heating apparatus according to the present invention comprises:

a cylinder block forming an enclosed space therein;

a gear pump means enclosed in the cylinder block, and including:

an input shaft connected to an engine and disposed in the enclosed space;

a driving gear fixed to the input shaft and disposed in the enclosed space;

a driven gear meshing with the driving gear and disposed in the enclosed space; and a viscous fluid sealed in the enclosed space;

whereby forcibly transferring the viscous fluid from a suction side to a discharge side by the rotation of the driving gear and the driven gear and causing a back flow of the viscous fluid resulting from an internal leakage from the discharge side to the suction side, and heating the viscous fluid in the enclosed space; and a water jacket formed in the cylinder block outside the gear pump means, whereby converting heat generated by the viscous fluid to a temperature increment of circulating water.

Moreover, the present automotive heating apparatus can further comprise a return passage formed in the cylinder block and connecting between the discharge side and the suction side, and a relief valve adapted for opening when a predetermined pressure is exerted thereto and disposed in the return passage.

In addition, the present automotive heating apparatus can be modified so as to comprise:

a cylinder block forming an enclosed space therein;

an internal gear pump means enclosed in the cylinder block, adapted for generating heat, and including:

an input shaft connected to an engine and disposed in the enclosed space;

a driving external gear disposed in the enclosed space and fixed to the input shaft;

a driven internal gear disposed rotatably with an annular clearance provided therearound in the enclosed space and meshing with the driving gear;

a suction space and a discharge space formed in the cylinder block outside and axially opposite to a meshing area where the driving external gear and the driven internal gear mesh;

a communication passage communicating the annular clearance with the discharge space; and a viscous fluid sealed in the enclosed space;

a relief valve disposed in a return passage communicating the discharge space with the suction space and adapted for opening when a predetermined pressure is exerted thereto: and a water jacket formed in the cylinder block outside the internal gear pump means, whereby converting heat generated by the viscous fluid to a temperature increment of circulating water.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

In the automotive heating apparatus according to the present invention, the input shaft of the gear pump means is rotated by the engine, and accordingly the driving gear and the driven gear are rotated in the enclosed space so as to produce the suction side and the discharge side for the viscous fluid in the enclosed space. Hence, the viscous fluid is forcibly transferred from the suction side to the discharge side, and at the same time the back flow of the viscous fluid is caused by the internal leakage from the discharge side to the suction side. As a result, the viscous fluid is stirred and sheared between the driving gear and the driven gear, the internal energy of the viscous fluid is increased by the resulting pressure difference between the discharge side and the suction side, and consequently the viscous fluid generates heat. The heat generated by the viscous fluid is converted to the temperature increment of the circulating water by the water jacket formed in the cylinder block outside the gear pump means, and the circulating water thus heated is used to heat a passenger room through a heater. Thus, the automotive heating apparatus can achieve the heating in the passenger room relatively quickly after starting the engine.

Since the present automotive heating apparatus employs the gear pump means whose driving gear and driven gear are smaller and can be processed easier than are the labyrinth grooves of the rotor and the cover of the conventional automotive heating apparatus, it is inhibited from enlarging so as to produce a good onboardability and can be manufactured at a remarkably reduced manufacturing cost.

In the case that the present automotive heating apparatus further comprises the return passage and the relief valve, the relief valve opens, and thereby the discharge side and the suction side are communicated with the return passage when the pressure increment at the discharge side exceeds a predetermined value. Namely, other than the back flow passage resulting from the internal leakage described above, the viscous fluid is escaped smoothly from the discharge side to the suction side through the return passage. Consequently, the pressure difference between the discharge side and the suction side is reduced, and the resistance is relieved while forcibly transferring the viscous fluid. As a result, the stirring, the shearing and the internal energy increment of the viscous fluid are regulated, and the viscous fluid is inhibited from generating the heat.

Namely, in the present automotive heating apparatus comprising the extra component members, when the relief valve opens, the proportional relationship between the driving torque "T" of the input shaft and the number of engine revolutions "N" can be avoided or interrupted without turning on and off an electromagnetic clutch. Thus, the present automotive heating apparatus further comprising the extra component members requires a less power "L" and puts a less load to the engine and it is less likely to produce an excessive heating capacity even during high speed automotive driving. Therefore, in accordance with the present automotive heating apparatus comprising the extra component member, the electromagnetic clutch is turned on and off less frequently so that its life can be prolonged and so that automotive driving feeling can be improved eventually.

As having been described so far, the present automotive heating apparatus employs the novel construction in which the gear pump means and the water jacket are incorporated into the cylinder block. Hence, the present automotive heating apparatus can achieve the heating in the passenger room relatively quickly after starting the engine. Further, it enable to produce a good on-boardability, and at the same time it accomplishes a remarkable reduction in the manufacturing cost.

Moreover, in the case that the present automotive heating apparatus further employs the return passage formed between the discharge side and the suction side and the relief valve which opens when a predetermined pressure is exerted thereto, the present automotive heating apparatus comes to require a less power "L" so as to put a less load to the engine without frequently turning on and off the electromagnetic clutch even during high speed automotive driving, and thereby it works to prolong the life of the electromagnetic clutch and improves the automotive driving feeling eventually, in addition to the aforementioned advantages, e.g., the relatively quick passenger room heating, the good on-boardability and the remarkably reduced manufacturing cost.

likewise, the modified version of the automotive heating apparatus according to the present invention, the input shaft of the internal gear pump means is rotated by the engine, and accordingly the driving external gear and the driven internal gear are rotated in the enclosed space. Hence, the viscous fluid is forcibly transferred from the suction space to the discharge space, and there arises a pressure difference between the discharge space and the suction space in the viscous fluid. When the discharge space is highly pressurized, the annular clearance is also highly pressurized by way of the communication passage, during which the viscous fluid is stirred and sheared between the driving external gear and the driven internal gear. The viscous fluid whose internal energy is thus increased by the pressurizing is further sheared in the annular clearance, and at the same time it is sheared uniformly because the annular space encloses the outer periphery of the driven internal gear uniformly. All in all, the viscous fluid is caused to generate heat effectively and uniformly.

Also, in the modified version of the present automotive heating apparatus, when the pressure difference between the discharge space and the suction space exceeds a predetermined value, the relief valve opens, and thereby the discharge space and the suction space are communicated with the return passage Namely, the viscous fluid is escaped smoothly from the discharge space to the suction space through the return passage. Consequently, the upper limit of the pressure is regulated in the discharge space, and at the same time the upper limit of the resistance resulting from the forcibly transferred viscous fluid is also regulated. In other words, the pressure difference between the discharge space and the suction space is reduced, the resistance is relieved while forcibly transferring the viscous fluid, and the pressure is reduced in the annular space. As a result, the stirring, the shearing and the internal energy increment of the viscous fluid are regulated, and the viscous fluid is inhibited from generating the heat.

The heat generated by the viscous fluid is converted to the temperature increment of the circulating water by the water jacket formed in the cylinder block outside the internal gear pump means. Since the annular clearance is disposed so as to form the outer periphery of the internal gear pump means, the heat exchange can be carried out effectively between the heated viscous fluid in the annular clearance and the circulating water in the water jacket. The heated circulating water is used to heat the passenger room through a heater. Therefore, the modified version of the present automotive heating apparatus can achieve the heating in the passenger room relatively quickly after starting the engine.

Moreover, in the modified version of the present automotive heating apparatus, when the relief valve opens, the upper limit of the resistance resulting from the forcibly transferred the viscous fluid is regulated, the proportional relationship between the driving torque "T" of the input shaft and the number of engine revolutions "N" can be avoided or interrupted without turning on and off an electromagnetic clutch. Thus, the modified version of the present automotive heating apparatus requires a less power "L" and puts a less load to the engine, too, and it is less likely to produce an excessive heating capacity even during high speed automotive driving. Therefore, in accordance with the the modified version of the present automotive heating apparatus, the electromagnetic clutch is turned on and off less frequently so that its life can be prolonged and so that the automotive driving feeling can be improved eventually.

Since the modified version of the present automotive heating apparatus employs the internal gear pump means whose driving external gear and driven internal gear are smaller and can be processed easier than are the labyrinth grooves of the rotor and the cover of the conventional automotive heating apparatus, it is also inhibited from enlarging so as to produce a good on-boardability and can be also manufactured at a remarkably reduced manufacturing cost.

As having been described so far, the modified version of the present automotive heating apparatus employs the novel construction in which the internal gear pump means, the relief valve and the water jacket are incorporated into the cylinder block. Hence, the modified version of the present automotive heating apparatus can also achieve the heating in the passenger room relatively quickly after starting the engine. Further, it also enables to produce a good on-boardability, and at the same time it also accomplishes a remarkable reduction in the manufacturing cost. Furthermore, in addition to the aforementioned advantages, e.g., the relatively quick passenger room heating, the good on-boardability and the remarkably reduced manufacturing cost, the modified version of the present automotive heating apparatus comes to reduce the load to the engine and the frequency of turning on and off the electromagnetic clutch even during high speed automotive driving, and thereby it works to prolong the life of the electromagnetic clutch and improves the automotive driving feeling eventually.

Moreover, since the modified version of the present automotive heating apparatus shears the viscous fluid whose internal energy is raised in order to generate the heat, it can provide heating effect better than the conventional automotive heating apparatus does. Additionally, since it employs the internal gear pump means, it not only enables to reduce the noises and pulsations but also to further down-size its external dimensions.

Having generally described the present invention, a further understanding can be obtained by reference to the specific preferred embodiments which are provided herein for purposes of illustration only and are not intended to limit the scope of the appended claims.

First Preferred Embodiment

The First Preferred Embodiment of the automotive heating apparatus according to the present invention will be hereinafter described with reference to FIGS. 1 and 2.

Figure 1:
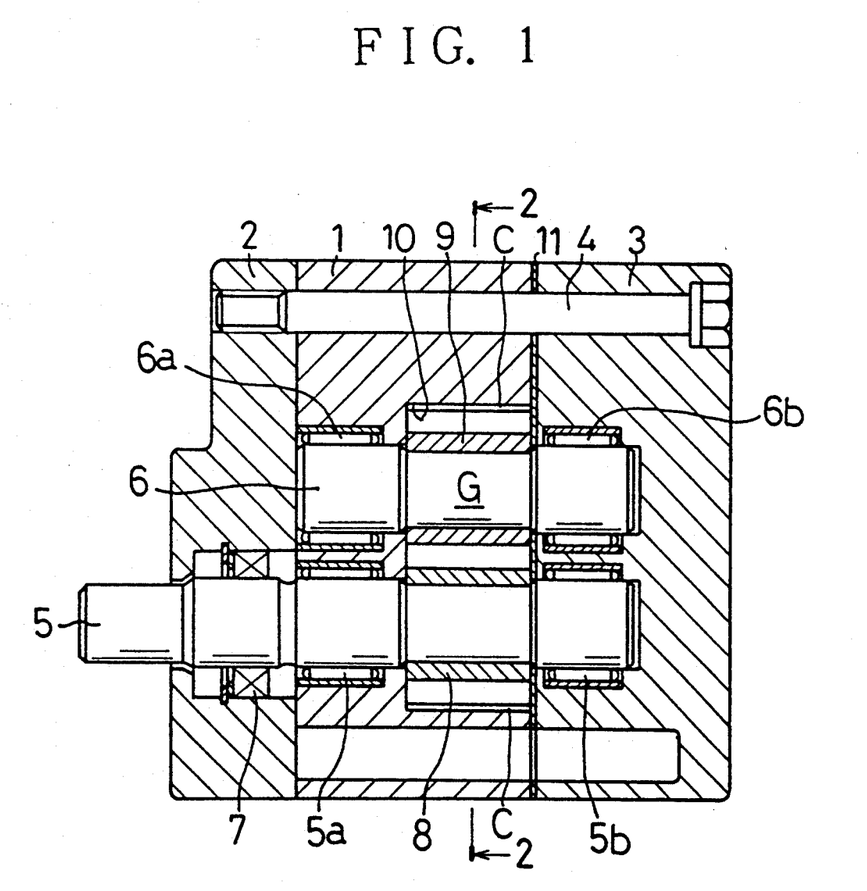
FIG. 1 is a cross sectional view of a First Preferred Embodiment of an automotive heating apparatus according to the present invention taken along line 1—1 of FIG. 2.
Figure 2:
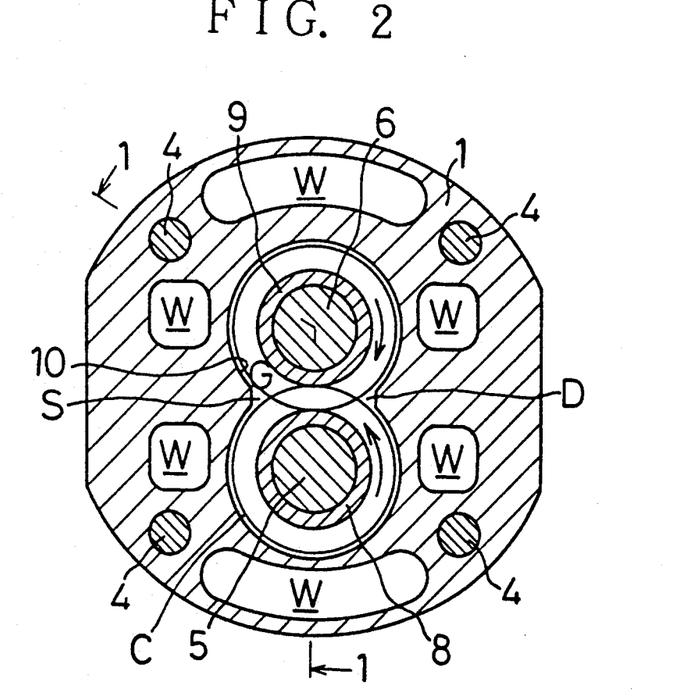
FIG. 2 is a cross sectional view of the First Preferred Embodiment of the present automotive heating apparatus taken along line 2—2 of FIG. 1.

As illustrated in FIGS 1 and 2, in the First Preferred Embodiment of the present automotive heating apparatus, there is constructed an external gear pump means "G" in a cylinder block 1. Specifically speaking, as illustrated in FIG. 2, there is formed an enclosed space 10 in a cocoon shape in the cylinder block 1. Turning now to FIG. 1, this cylinder block 1 is enclosed with a front cover 2 at the front end surface, and it is enclosed with a rear cover 3 at the rear end surface. The cylinder block 1 is fixed to the front cover 2 and the rear cover 3 with four bolts 4 (shown in FIG. 2), and a gasket 11 is further disposed between the rear end surface of the cylinder block 1 and front end surface of the rear cover 3.

As illustrated in FIGS. 1 and 2, in the cylinder block 1, the gasket 11 and the rear cover 3, there are formed two shaft holes adjacent to the enclosed space 10. In one of the two shaft holes, an input shaft 5 is disposed rotatably with bearings 5a and 5b as illustrated in FIG. 1. In another one of the two shaft holes, a driven shaft 6 is disposed rotatably with bearings 6a and 6b as illustrated in FIG. 1. Further, a through hole is made in the front cover 2, and the input shaft 5 is disposed therein by way of a shaft sealing device 7 so as to penetrate the front cover 2.

As best shown in FIG. 1, the input shaft 5 is connected to an engine (not shown) by way of an electromagnetic clutch (not shown) at the end, and it is fixed to a driving gear 8 at the intermediate portion adjacent to the other end in the enclosed space 10. The driven shaft 6 is fixed to a driven gear 9, which meshes with the driving gear 8, at the intermediate portion in the enclosed space 10. Further, as best shown in FIG. 2, there is provided a predetermined clearance "C" between the meshing area of the driving gear 8 and the driven gear 9 and the peripheral wall of the enclosed space 10, between the driving gear 8 and the peripheral wall of the enclosed space 10, and between the driven gear 9 and the peripheral wall of the enclosed space 10. Furthermore, a silicone oil is filled in the clearance "C".

As illustrated in FIG. 2, there are formed a plurality of water jackets "W" communicating with each other outside and around the external gear pump means "G" in the cylinder block 1 and the rear cover 3. These water jackets "W" are connected with a heater (not shown) by way of a water pump (not shown) so as to circulate circulating water.

The operations of the First Preferred Embodiment of the present automotive heating apparatus thus constructed will be hereinafter described. When the electromagnetic clutch is turned on and the rotation of the engine is conveyed to the input shaft 5 of the external gear pump means "G", the driving gear 8 and the driven gear 9 are rotated in the enclosed space 10 in the directions of the arrows shown in FIG. 2, respectively. At this moment, the silicone oil is forcibly transferred by the driving gear 8 and the driven gear 9, and thereby there arise a discharge side "D" and a suction side "S" in the enclosed space 10. At the same time, the clearance "C" causes a back flow of the silicone oil from the discharge side "D" to the suction side "S". As a result, the silicone oil is stirred and sheared between the driving gear 8 and the driven gear 9, and the internal energy of the silicone oil is increased by the pressure difference resulting from the back flow of the silicone oil in the clearance "C". Thus, the silicone oil generates heat.

The heat generated by the silicone oil is then converted to a water temperature increment of the circulating water in the water jackets "W" by way of the cylinder block 1. The heated circulating water is used to heat the passenger room through the heater. Therefore, the First Preferred Embodiment of the present automotive heating apparatus can achieve the heating in the passenger room relatively quickly after starting the engine.

In addition, the First Preferred Embodiment of the present automotive heating apparatus employs the external gear pump means "G" whose driving gear 8 and driven gear 9 are smaller and can be processed easier than are the labyrinth grooves of the rotor and the cover of the conventional automotive heating apparatus set forth in the above-mentioned Japanese Unexamined Patent Publication (KOKAI) No. 246,823/1990. Accordingly, it is inhibited from enlarging so as to produce a good on-boardability, and it can be manufactured at a remarkably reduced manufacturing cost.

Second Preferred Embodiment

The Second Preferred Embodiment of the automotive heating apparatus according to the present invention will be hereinafter described with reference to FIGS. 3 through 5.

Figure 3:
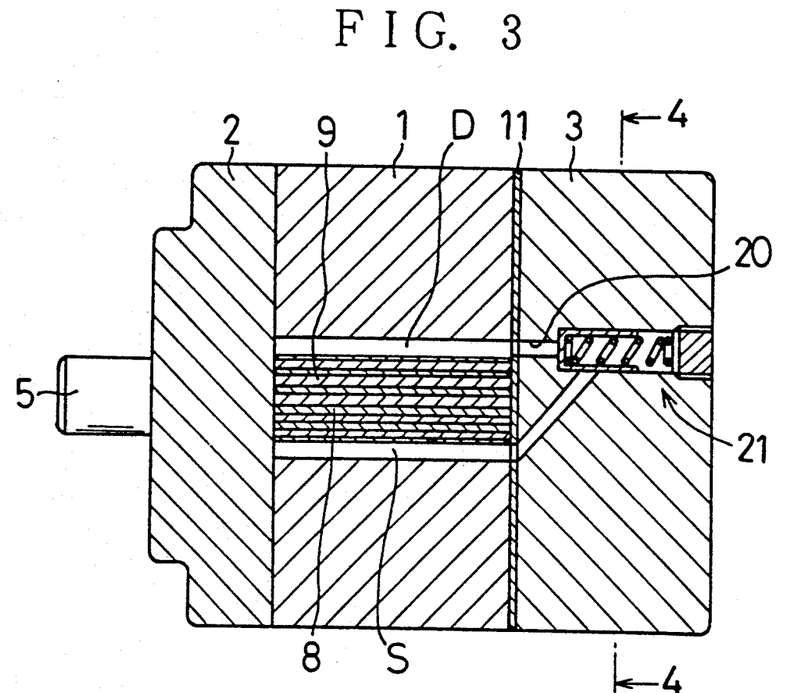
FIG. 3 is a cross sectional view of a Second Preferred Embodiment of an automotive heating apparatus according to the present invention taken along line 3—3 of FIG. 4.
Figure 4:
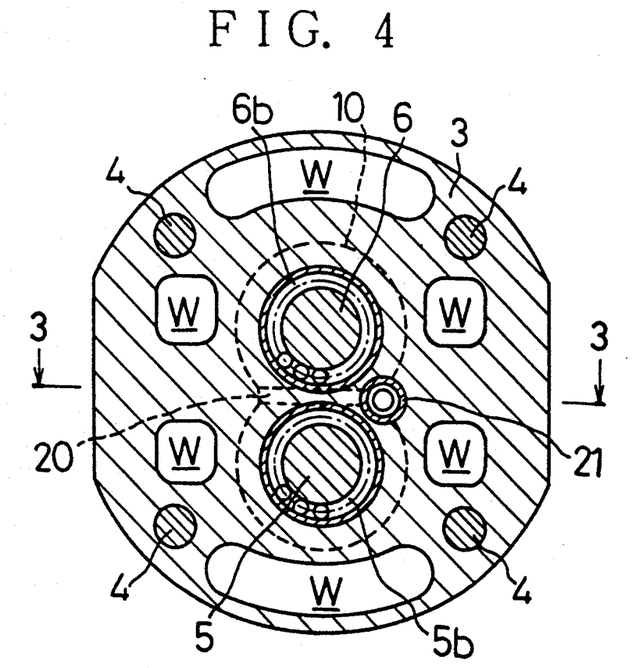
FIG. 4 is a cross sectional view of the Second Preferred Embodiment of the present automotive heating apparatus taken along line 4—4 of FIG. 3.

As illustrated in FIGS. 3 and 4, in addition to the construction of the First Preferred Embodiment of the present automotive heating apparatus, the Second Preferred Embodiment thereof further includes a return passage 20 formed in the cylinder block 1 and communicating between the discharge side "D" and the suction side "S", and a relief valve 21 disposed in the return passage 20 and adapted for opening when a predetermined pressure is exerted thereto. The component members having similar constructions and operations to those of the First Preferred Embodiment are designated with the same reference numbers or designations in the drawing, and they will not be described in detail.

In the Second Preferred Embodiment of the present automotive heating apparatus, when the pressure increment at the discharge side "D" exceeds a predetermined value, namely when the pressure at the discharge side "D" overcomes the urging force exerted by the spring of the relief valve 21, the relief valve 21 opens, and thereby the discharge side "D" and the suction side "S" are communicated with the return passage 20. Then, other than the back flow passage of the internal leakage resulting from the clearance "C", the silicone oil is escaped smoothly from the discharge side "D" to the suction side "S" through the return passage 20. Consequently, the pressure difference between the discharge side "D" and the suction side "S" is reduced, and the resistance is relieved while forcibly transferring the silicone oil. As a result, the stirring, the shearing and the internal energy increment of the silicone oil are regulated, and accordingly the silicone oil is inhibited from generating the heat.

Figure 5:
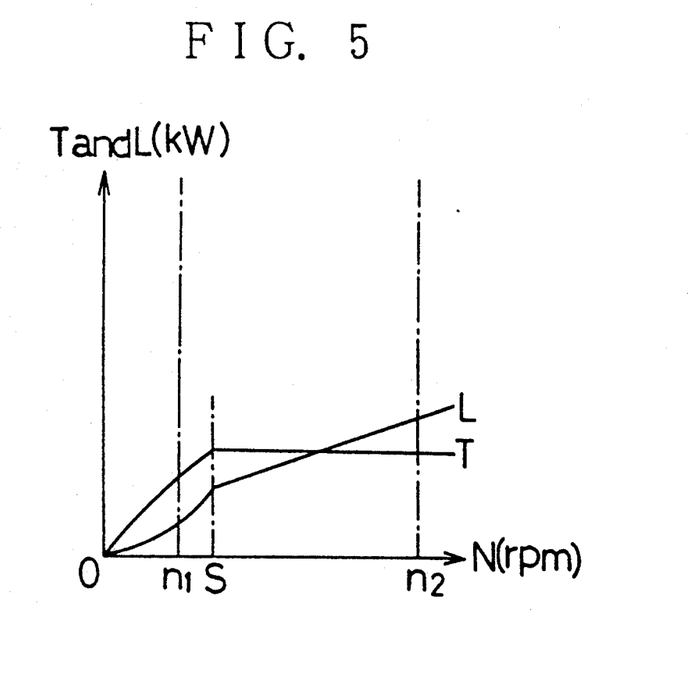
FIG. 5 is a graphic representation on a relationship between the input shaft driving torques and the number of engine revolution in the Second Preferred Embodiment of the present automotive heating apparatus.

To put it differently, in the Second Preferred Embodiment of the present automotive heating apparatus, as illustrated in FIG. 5, when the relief valve 21 opens at the time "S", the proportional relationship between the driving torque "T" of the input shaft 5 and the number of engine revolutions "N" can be avoided or interrupted without turning on and off the electromagnetic clutch. Thus, the Second Preferred Embodiment of the present automotive heating apparatus requires a less power "L" and puts a less load to the engine. Moreover, since the Second Preferred Embodiment of the present automotive heating apparatus is less likely to produce an excessive heating capacity even during high speed automotive driving, the electromagnetic clutch can be engaged continuously so that its life can be prolonged, and the automotive driving feeling can be improved eventually.

In the First and Second Preferred Embodiments of the present automotive heating apparatus, the external gear pump means "G" is employed as the gear pump means. However, the present invention is not limited thereto. Namely, instead of the external gear pump means "G", the present automotive heating apparatus can employ an internal gear pump means such as an internal gear pump means comprising a parting plate, an internal gear pump means comprising internal and external gears having a trochoid-shaped gear teeth or the like as later described in detail on the Third and Fourth Preferred Embodiments of the present automotive heating apparatus. In addition, other than the silicone oil, the present automotive heating apparatus can employ a general-purpose type hydraulic oil.

Third Preferred Embodiment

The Third Preferred Embodiment of the automotive heating apparatus according to the present invention will be hereinafter described with reference to FIGS. 6 through 9.

Figure 6:
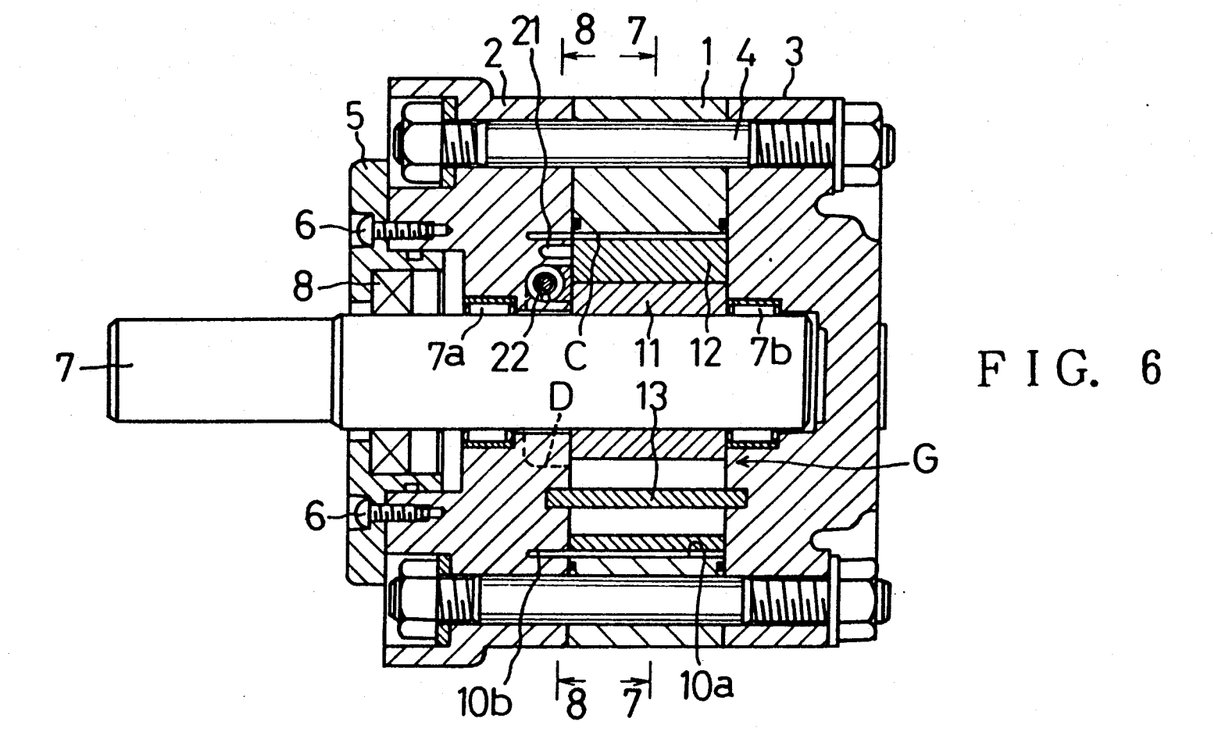
FIG. 6 is a cross sectional view of a Third Preferred Embodiment of an automotive heating apparatus according to the present invention taken along line 6—6 of FIG. 7.

As illustrated in FIG. 6, in the Third Preferred Embodiment of the present automotive heating apparatus, a cylinder block 1 is connected to a front housing 2 and a rear housing 3 with bolts 4 at the front end and at the rear end, respectively. The front housing 2 is connected to an oil sealing cover 5 with bolts 6. Moreover, there is constructed an internal gear pump means "G" in the cylinder block 1 and the front housing 2.

Figure 7:
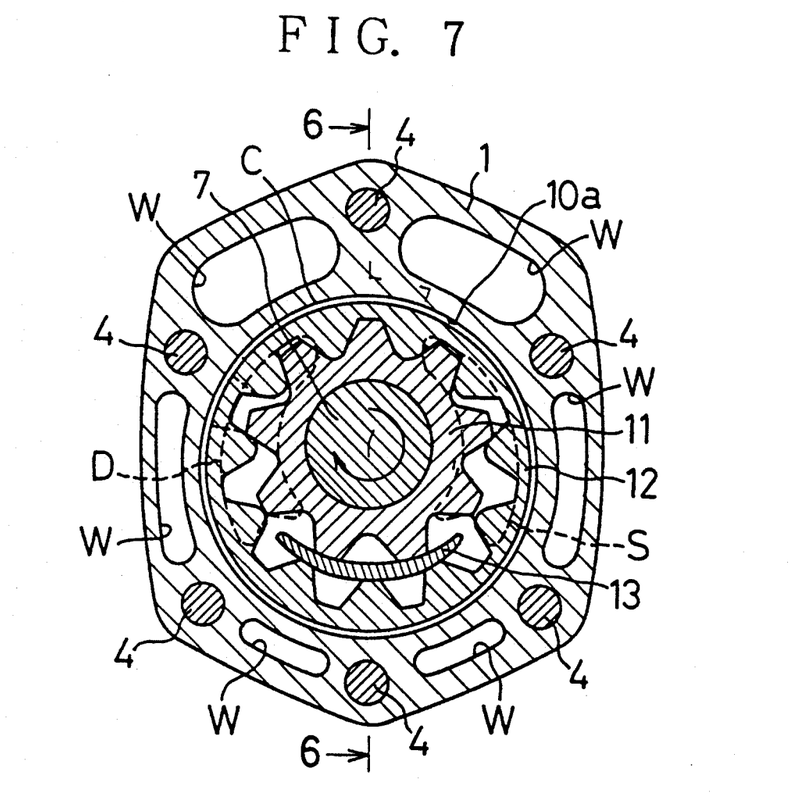
FIG. 7 is a cross sectional view of the Third Preferred Embodiment of the present automotive heating apparatus taken along line 7—7 of FIG. 6.
Figure 8:
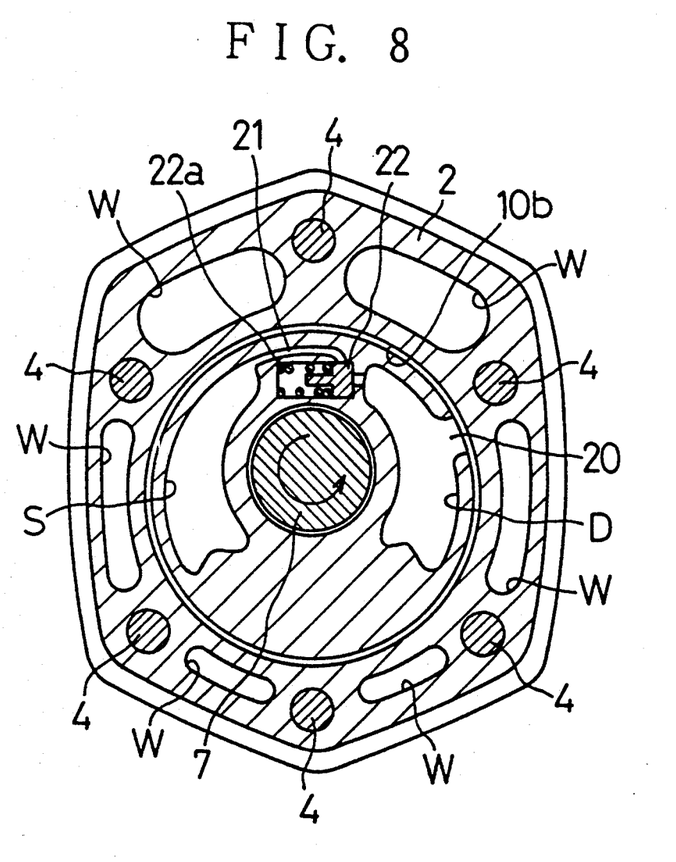
FIG. 8 is a cross sectional view of the Third Preferred Embodiment of the present automotive heating apparatus taken along line 8—8 of FIG. 6.

Specifically speaking, as illustrated in FIG. 7, there is formed an enclosed space 10a in a cylindrical shape in the cylinder block 1. As illustrated in FIG. 8, there is formed an enclosed space 10b in a cylindrical shape in the front housing 2. The enclosed space 10b is coaxial with the enclosed space 10a, and its peripheral surface is flush with the peripheral surface of the enclosed space 10a. O-rings are provided around the outer peripheral areas of these enclosed spaces 10a and 10b as illustrated in FIG. 6, thereby maintaining an airtight state between the cylinder block 1 and the front housing 2 as well as between the cylinder block 1 and the rear housing 3.

As illustrated in FIG. 6, there is formed a shaft hole by drilling in the front housing 2 so as to penetrate the front housing 2, and there is also formed a shaft hole by drilling in the rear housing 3 as well. The shaft holes are coaxial with the enclosed space 10a of the cylinder block 1. An input shaft 7 is rotatably disposed in the shaft holes by way of a shaft sealing device 8 retained in the oil sealing cover 5, bearing 7a retained in the front housing 2 and bearing 7b retained in the rear housing 3. The input shaft 7 is connected to an engine (not shown) by way of an electromagnetic clutch (not shown) at the end, and it is fixed to a driving external gear 11 at the intermediate portion adjacent to the other end in the enclosed space 10.

As illustrated in FIG. 7, a driven internal gear 12, which meshes with the driving external gear 11, is disposed rotatably in the enclosed space 10a so as to provide a predetermined annular clearance "C" between itself and the peripheral wall of the enclosed space 10a, and a parting plate 13 is interposed in the non-meshing area between the driving external gear 11 and the driven internal gear 12. As illustrated in FIG. 6, the parting plate 13 is supported with the front housing 2 and the rear housing 3 at the axial ends.

As illustrated in FIG. 8, there are formed a suction space "S" and a discharge space "D" in the front housing 2 outside and axially opposite to the meshing area between the driving external gear 11 and the driven internal gear 12. The discharge space "D" is communicated with the enclosed space 10b through a communication passage 20. Further, there is formed a return passage 21 in the front housing 2. The return passage 21 communicates between the suction space "S" and the discharge space "D," and there is disposed a relief valve 22, which is urged by a spring 22a so as to close the return passage 21, in the return passage 21. Furthermore, a silicone oil if filled between the driving external gear 11 and the driven internal gear 12, between the driving external gear 11 and the parting plate 13 and between the parting plate 13 and the driven internal gear 12 as well as in the suction space "S," the discharge space "D" and in the annular clearance "C."

As illustrated in FIG. 7, there are formed a plurality of water jackets "W" communicating with each other outside and around the internal gear pump means "G" in the cylinder block 1, the front housing 2 and the rear housing 3. These water jackets "W" are connected with a heater (not shown) by way of a water pump (not shown) so as to circulate circulating water.

The operations of the Third Preferred Embodiment of the present heating apparatus thus constructed will be hereinafter described. When the electromagnetic clutch is turned on and the rotation of the engine is conveyed to the input shaft 7 of the internal gear pump means "G," the input shaft 7 is rotated in the directions of the arrows shown in FIGS. 7 and 8, and thereby the driving external gear 11 and the driven internal gear 12 are rotated in the direction of the arrow shown in FIG. 7 in the enclosed space 10a. Consequently, the silicone oil is forcibly transferred from the suction space "S" to the discharge space "D" by the driving external gear 11 and the driven internal gear 12, and thereby there arises the pressure difference between the discharge space "D" and the suction space "S" in the silicone oil. At this moment, the annular clearance "C" is highly pressurized by the thus pressurized discharge space "D" by way of the communication passage 20. At the same time, the silicone oil is stirred and sheared between the driving external gear 11 and the driven internal gear 12, between the driving external gear 11 and the parting plate 13, and between the parting plate 13 and the driven internal gear 12. Further, since the silicone oil is highly pressurized in the annular clearance "C," not only the internal energy of the silicone oil is increased by the pressurization in the annular clearance "C," but also the silicone oil having the thus increased internal energy is further sheared therein. Furthermore, the annular clearance "C" uniformly encloses the outer periphery of the driven internal gear 12, and accordingly the silicone oil is sheared uniformly. All in all, the silicone oil generates heat effectively and uniformly.

Then, in the Third Preferred Embodiment of the present automotive heating apparatus, when the pressure difference between the discharge space "D" and the suction space "S" exceeds a predetermined value, the relief valve 22 overcomes the urging force of the spring 22a and opens the return passage 21, and thereby the discharge space "D" and the suction space "S" are communicated with each other with the return passage 21. Consequently, the silicone oil is escaped smoothly from the discharge space "D" to the suction space "D." As a result, the upper limit of the pressure in the discharge space "D" is regulated, and at the same time the upper limit of the resistance is relieved while forcibly transferring the silicone oil. To put it differently, the pressure difference between the discharge space "D" and the suction space "S" is reduced, the resistance is exerted less while forcibly transferring the silicone oil, and the pressure is decreased in the annular clearance "C." Thus, the stirring, the shearing and the internal energy increment of the silicone oil are regulated, and accordingly the silicone oil is inhibited from generating the heat.

The heat generated by the silicone oil is then converted to a water temperature increment of the circulating water in the water jackets "W" by way of the cylinder block 1, the front housing 2 and the rear housing 3. During the conversion, since the outer periphery of the internal gear pump means "G" is formed by the annular clearance "C," the heat exchange can be carried out effectively between the heated silicone oil in the annular clearance "C" and the circulating water in the water jackets "W." The heated circulating water is used to heat the passenger room through the heater. Therefore, the Third Preferred Embodiment of the present automotive heating apparatus can achieve the heating in the passenger room relatively quickly after starting the engine.

Figure 9:
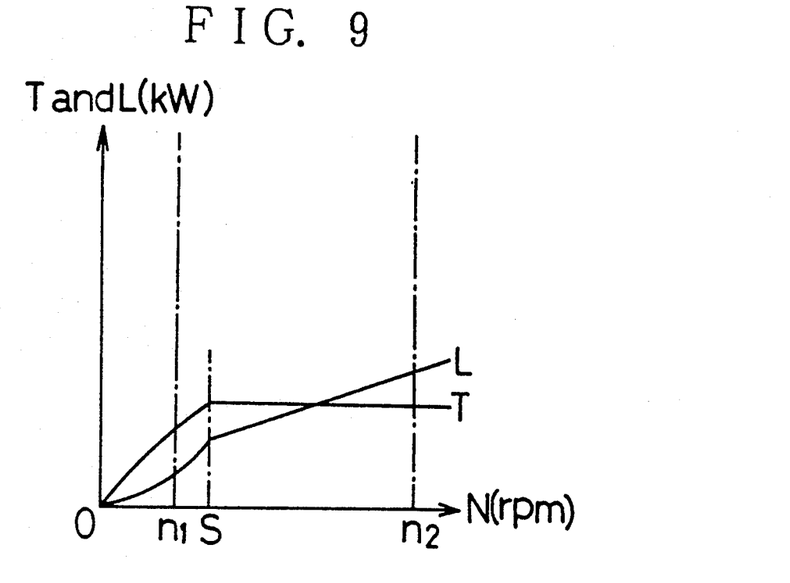
FIG. 9 is a graphic representation on a relationship between the input shaft driving torques and the number of engine revolutions in the Third Preferred Embodiment of the present automotive heating apparatus.

In the Third Preferred Embodiment of the present automotive heating apparatus, when the relief valve 22 opens, the upper limit of the resistance is regulated while forcibly transferring the silicone oil, and accordingly the proportional relationship between the driving torque "T" of the input shaft 7 and the number of engine revolutions "N" can be avoided or interrupted without turning on and off the electromagnetic clutch. Namely, as illustrated in FIG. 9, when the relief valve 21 opens at the time "S," the proportional relationship between the driving torque "T" of the input shaft 7 and the number of engine revolutions "N" can be avoided or interrupted in the ordinary service area, e.g., the number of engine revolutions "N" between "$n_1$" and "$n_2$," without turning on and off the electromagnetic clutch. Thus, the Third Preferred Embodiment of the present automotive heating apparatus requires a less power "L" and puts a less load to the engine. Moreover, since the Third Preferred Embodiment of the present automotive heating apparatus is less likely to produce an excessive heating capacity even during high speed automotive driving, the electromagnetic clutch can be turned on and off less frequently so that its life can be prolonged, and the automotive driving feeling can be improved eventually.

Further, the Third Preferred Embodiment of the present automotive heating apparatus employs the internal gear pump means "G" whose external driving gear 11, driven internal gear 12 and parting plate 13 are smaller and can be processed easier than are the labyrinth grooves of the rotor and the cover of the conventional automotive heating apparatus set forth in the above-mentioned Japanese Unexamined Patent Publication (KOKAI) No. 246,823/1990. Accordingly, it is inhibited from enlarging so as to produce a good on-boardability, and it can be manufactured at a remarkably reduced manufacturing cost.

Furthermore, the silicone oil circulates in the Third Preferred Embodiment of the present automotive heating apparatus, and thereby the silicone oil becomes uniform in the temperature. Consequently, the temperature of the silicone oil does not increase locally, and the deterioration of the silicone oil resulting therefrom is inhibited from happening.

In addition, since the Third Preferred Embodiment of the present automotive heating apparatus employs the gear pump means, it enables to reduce the noises and pulsations more than piston pump means does. In particular, since the gear pump means is the internal type gear pump means in the Third Preferred Embodiment of the present automotive heating apparatus, the internal gear pump means "G" enables to further down-size the external dimensions of the present automotive heating apparatus than the external type gear pump means.

In the Third Preferred Embodiment of the present automotive heating apparatus, the internal gear pump means "G" comprising the parting plate 13 is employed as the gear pump means. However, the present automotive heating apparatus is not limited thereto. Namely, instead of the internal gear pump means "G" comprising the parting plate 13, the present invention can employ an internal gear pump means such as an internal gear pump means comprising internal and external gears having a trochoid-shaped gear teeth or the like as later described in detail on the Fourth Preferred Embodiment of the present automotive heating apparatus. In addition, since the present automotive heating apparatus highly pressurizes the silicone oil filled in the enclosed space and thereafter it shears the silicone oil so as to generate the heat, it can employ a general-purpose type hydraulic oil other than the silicone oil. Even if such is the case, the present automotive heating apparatus can still produce the heat in a sufficient generation.

Fourth Preferred Embodiment

The Fourth Preferred Embodiment of the automotive heating apparatus according to the present invention will be hereinafter described with reference to FIG. 11.

Figure 11:
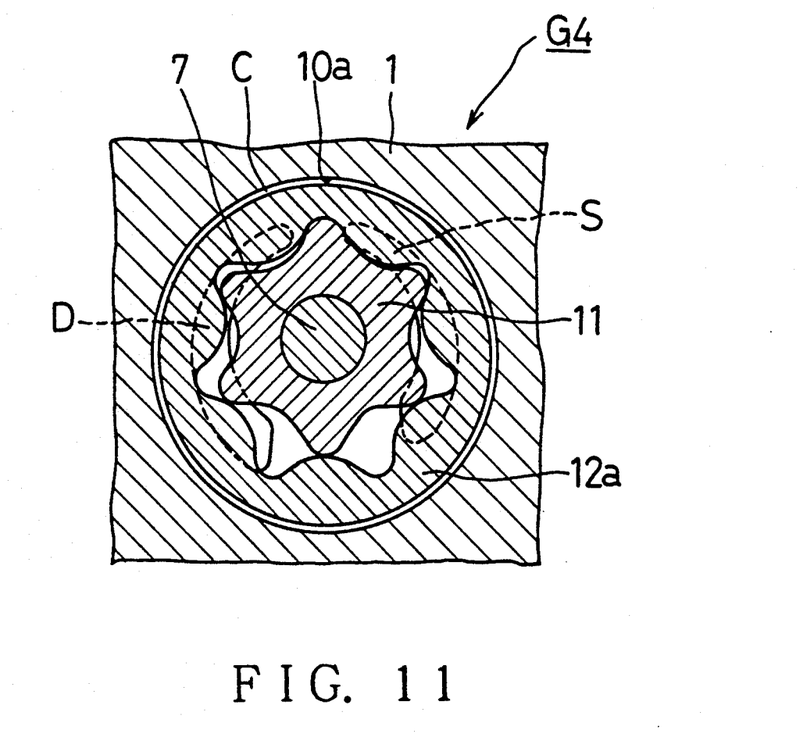
FIG. 11 is a cross sectional view of a Fourth Preferred Embodiment of an automotive heating apparatus according to the present invention cut similarly to FIG. 7.

As illustrated in FIG. 11, the Fourth Preferred Embodiment of the present automotive heating apparatus employs an internal gear pump means "G4," which comprises a driving external gear 11a having a trochoid-shaped gear teeth and a driven internal gear 12a having a trochoid-shaped gear teeth and meshing with the driving external gear 11a, instead of the internal gear pump means "G," which comprises the external driving gear 11, the driven internal gear 12 meshing with the external driving gear 11 and the parting plate 13 interposed in the non-meshing area between the driving external gear 11 and the internal driven gear 12, of the Third Preferred Embodiment. Other than the internal gear pump means "G4," the Fourth Preferred Embodiment of the present automotive heating apparatus has the same constructions as those of the Third Preferred Embodiment. The component members having similar constructions and operations to those of the Third Preferred Embodiment are designated with the same reference numbers or designations in the drawing, and they will not be described in detail.

The Fourth Preferred Embodiment of the present automotive heating apparatus differs from the Third Preferred Embodiment in that it employs the internal gear pump means "G4." However, it has been known that the internal gear pump means "G4" operates in a manner similar to the internal gear pump means "G" of the Third Preferred Embodiment thereof.

Hence, the Fourth Preferred Embodiment of the present automotive heating apparatus operates and produces advantageous effects identically with those of the Third Preferred Embodiment, for instance, the relatively quick passenger room heating, the good on-boardability, the remarkably reduced manufacturing cost, the prolonged life of the electromagnetic clutch, the improved automotive driving feeling, the reduction in the noises and pulsations, the further down-sized external dimensions, and the uniformly heated silicone oil.

Having now fully described the present invention, it will be apparent to one of ordinary skill in the art that many changes and modifications can be made thereto without departing from the spirit or scope of the present invention as set forth herein including the appended claims.

What is claimed is:

1. An automotive heating apparatus, comprising:
   a cylinder block forming an enclosed space therein;
   a gear pump means enclosed in said cylinder block, and including:
     an input shaft connected to an engine and disposed in said enclosed space;
     a driving gear fixed to the input shaft and disposed in said enclosed space;
     a driven gear meshing with the driving gear and disposed in said enclosed space; and
     a viscous fluid sealed in said enclosed space;
   whereby forcibly transferring the viscous fluid from a suction side to a discharge side by the rotation of the driving gear and the driven gear and causing a back flow of the viscous fluid resulting from an internal leakage from the discharge side to the suction side, and heating the viscous fluid in said enclosed space; and
     a water jacket formed in said cylinder block outside said gear pump means, whereby converting heat generated by said viscous fluid to a temperature increment of circulating water.

2. The automotive heating apparatus according to claim 1 further comprises a return passage formed in said cylinder block and connecting between said discharge side and said suction side, and a relief valve adapted for opening when a predetermined pressure is exerted thereto and disposed in said return passage.

3. The automotive heating apparatus according to claim 1, wherein said gear pump means is an external gear pump means which includes a driving external gear fixed to said input shaft, and a driven internal gear meshing with the driving gear and fixed to a driven shaft disposed in said enclosed space.

4. The automotive heating apparatus according to claim 3, wherein said discharge side and said suction side are communicated with each other through a clearance which is formed between the peripheral wall of said cylinder block forming said enclosed space and the outer periphery of said external gear pump means.

5. The automotive heating apparatus according to claim 3 further comprises a return passage formed in said cylinder block and connecting between said discharge side and said suction side, and a relief valve adapted for opening when a predetermined pressure is exerted thereto and disposed in said return passage.

6. The automotive heating apparatus according to claim 1, wherein said gear pump means is an internal gear pump means which includes a driving external gear fixed said input shaft, a driven internal gear disposed rotatably with an annular clearance provided therearound in said enclosed space and meshing with the external driving gear, and a parting plate interposed in the non-meshing area between the driving external gear and the internal driven gear, and said discharge side and said suction side are communicated with each other through the annular clearance.

7. The automotive heating apparatus according to claim 6 further comprises a return passage formed in said cylinder block and connecting between said discharge side and said suction side, and a relief valve adapted for opening when a predetermined pressure is exerted thereto and disposed in said return passage.

8. The automotive heating apparatus according to claim 1, wherein said gear pump means is an internal gear pump means which includes a driving external gear having a trochoid-shaped gear teeth and fixed to said input shaft, and a driven internal gear having a trochoid-shaped gear teeth, disposed rotatably with an annular clearance provided therearound in said enclosed space and meshing with the driving external gear, and said discharge side and said suction side are communicated with each other through the annular clearance.

9. The automotive heating apparatus according to claim 8 further comprises a return passage formed in said cylinder block and connecting between said discharge side and said suction side, and a relief valve adapted for opening when a predetermined pressure is exerted thereto and disposed in said return passage.

10. An automotive heating apparatus, comprising:
    a cylinder block forming an enclosed space therein;
    an internal gear pump means enclosed in said cylinder block, adapted for generating heat, and including:
      an input shaft connected to an engine and disposed in said enclosed space;
      a driving external gear disposed in said enclosed space and fixed to the input shaft;
      a driven internal gear disposed rotatably with an annular clearance provided therearound in said enclosed space and meshing with the driving gear;
      a suction space and a discharge space formed in said cylinder block outside and axially opposite to a meshing area where said driving external gear and said driven internal gear mesh;
      a communication passage communicating said annular clearance with said discharge space; and
      a viscous fluid sealed in said enclosed space;
    a relief valve disposed in a return passage communicating said discharge space with said suction space and adapted for opening when a predetermined pressure is exerted thereto; and
    a water jacket formed in said cylinder block outside said internal gear pump means, whereby converting heat generated by said viscous fluid to a temperature increment of circulating water.

11. The automotive heating apparatus according to claim 10, wherein said return passage is formed in said cylinder block.

12. The automotive heating apparatus according to claim 10, wherein said internal gear pump means further includes a parting plate interposed in the non-meshing area between said driving external gear and said internal driven gear.

13. The automotive heating apparatus according to claim 10, wherein said internal gear pump means includes said driving external gear having a trochoid-shaped gear teeth, and said driven internal gear having a trochoid-shaped gear teeth.

* * * * *